United States Patent
Asakawa et al.

(10) Patent No.: US 8,494,860 B2
(45) Date of Patent: *Jul. 23, 2013

(54) VOICE OUTPUT DEVICE, INFORMATION INPUT DEVICE, FILE SELECTION DEVICE, TELEPHONE SET, AND PROGRAM AND RECORDING MEDIUM OF THE SAME

(75) Inventors: Chieko Asakawa, Kanagawa-ken (JP); Tohru Ifukube, Tokyo (JP); Shuichi Ino, Fuchu (JP); Hironobu Takagi, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 1429 days.

This patent is subject to a terminal disclaimer.

(21) Appl. No.: 12/136,963

(22) Filed: Jun. 11, 2008

(65) Prior Publication Data

US 2008/0241803 A1 Oct. 2, 2008

Related U.S. Application Data

(63) Continuation of application No. 10/923,939, filed on Aug. 23, 2004, now Pat. No. 7,403,897.

(30) Foreign Application Priority Data

Aug. 29, 2003 (JP) .................................. 2003-307271

(51) Int. Cl.
*G09B 21/006* (2006.01)

(52) U.S. Cl.
USPC ............................................................ 704/271

(58) Field of Classification Search
USPC ........................................................... 704/271
See application file for complete search history.

(56) References Cited

U.S. PATENT DOCUMENTS

| 6,963,762 | B2 * | 11/2005 | Kaaresoja et al. | ............ 455/567 |
| 7,403,897 | B2 * | 7/2008 | Asakawa et al. | ............... 704/271 |
| 8,027,705 | B2 * | 9/2011 | Kim et al. | ...................... 455/567 |

* cited by examiner

*Primary Examiner* — Susan McFadden
(74) *Attorney, Agent, or Firm* — Ido Tuchman; Anne V. Dougherty

(57) ABSTRACT

A device, computer program and method for outputting linguistic information. The voice output device, for example, includes an output information acquisition unit acquiring linguistic information and attribute information. Attribute information includes an attribute added to each linguistic element included in the linguistic information. A tactile pattern storage unit stores a predetermined tactile pattern corresponding to each linguistic element. A tactile pattern acquisition unit acquires the tactile pattern from the tactile pattern storage unit. A voice output unit reads aloud the linguistic elements and a tactile pattern output unit outputs, in parallel with reading aloud each linguistic element, the tactile pattern corresponding to the attribute added to the linguistic element, thereby allowing a user to sense the tactile pattern by the sense of touch.

6 Claims, 8 Drawing Sheets

VOICE OUTPUT DEVICE, INFORMATION INPUT DEVICE, FILE SELECTION DEVICE, TELEPHONE SET, AND PROGRAM AND RECORDING MEDIUM OF THE SAME

CROSS-REFERENCE TO RELATED APPLICATIONS

This application is a continuation of and claims priority under 35 U.S.C. §120 to U.S. patent application Ser. No. 10/923,939 filed Aug. 23, 2004 (U.S. Pat. No. 7,403,897 issued Jul. 22, 2008), which claims priority under 35 U.S.C. §119 to Japanese Patent Application No. JP2003-307271 filed Aug. 29, 2003, the entire text of which is specifically incorporated by reference herein.

FIELD OF THE INVENTION

The present invention relates to a system for providing information through a combination of visual, audio and tactile mechanisms that can be used by visually impaired people, people driving, and the like. Specifically, the present invention relates to a voice output device, an information input device, a file selection device, and a telephone set, each including a function to transmit information to users' sense of touch, and a program and a recording medium of the same.

BACKGROUND

Methods for presenting information by using voice or the sense of touch has been proposed, focusing on cases of presenting information to users moving or driving, visually-impaired people, and the like. For example, Japanese Patent Laid-Open Publication No. 10 (1998)-69218 is directed toward providing an interface which allows visually-impaired people to use window-compatible software with an interface to display window structure and functions of software on a tactile display and output window names and the like by voice when a user touches tactile pins.

International Publication WO00/17739 discloses an information processing apparatus for visually impaired people. Information is displayed on a tactile input/output device including input/output means arranged in a two-dimensional matrix. When a user inputs an operation on a predetermined area of the tactile input/output device, voice corresponding to the operation is outputted.

U.S. Pat. No. 6,278,441 discloses a tactile interface system provided with a plurality of displays including at least one tactile display. The plurality of displays display data selected from different portions of multiple data field environment.

Generally, the amount of information that can be transmitted per unit time is considered to decrease in order of the senses of sight, hearing, and touch. For example, rich text information which is information presented to the sense of sight is added with information concerning important parts, document structure, and the like by providing the information with attribute information such as character size, character decoration including bold, italic, or the like, and layout including line feed and indent in addition to text information as language information. Therefore, if information which should be presented through the sense which allows a larger amount of information to be transmitted per unit time is presented through another sense, understanding the information becomes difficult because of the excessive information, or there arises such a problem that part of information is lost.

SUMMARY OF THE INVENTION

The present invention addresses the above-mentioned limitations of the conventional art by efficiently transmitting linguistic information and attribute information in parallel to the different senses of the user. In other words, linguistic information and attribute information included in information to be outputted to a user are outputted to different senses of the user in parallel.

One exemplary aspect of the present invention is a voice output device for outputting linguistic information. The linguistic information includes a plurality of linguistic elements such as characters and phrases by voice. The voice output device includes an output information acquisition unit configured to acquire the linguistic information and attribute information. The attribute information includes an attribute added to each of the linguistic elements included in the linguistic information. A tactile pattern storage unit is configured to store a predetermined tactile pattern corresponding to each of attributes added to the linguistic elements. A tactile pattern acquisition unit is configured to acquire the tactile pattern corresponding to an attribute added to the linguistic elements from the tactile pattern storage unit. A voice output unit is configured to read aloud the linguistic elements included in the linguistic information. A tactile pattern output unit is configured to output, in parallel with reading aloud each of the linguistic elements, the tactile pattern corresponding to the attribute added to the linguistic element of interest, thereby allowing a user of the voice output device to sense the tactile pattern by sense of touch.

Another exemplary aspect of the invention is an information input device that displays an entry screen. The entry screen includes a plurality of entry fields and allows a user to input information in each of the entry fields. The information input device includes an entry screen display unit configured to display the entry screen and entry fields. An entry field information generation unit is configured to generate, when the user selects one of the entry fields, attribute information. The attribute information includes an attribute to identify whether input in the selected entry field is required. A tactile pattern storage unit is configured to store a predetermined tactile pattern corresponding to the attribute to identify whether input in the entry field of interest is required. A tactile pattern acquisition unit is configured to acquire the tactile pattern corresponding to the attribute added to the entry field selected by the user from the tactile pattern storing unit. A tactile pattern output unit is configured to output the tactile pattern corresponding to the attribute added to the selected entry field, thus allowing the user of the information input device to sense by the sense of touch whether input in the selected entry field is required.

Yet anther exemplary aspect of the invention is a file selection device for allowing a user to select a file from a plurality of files. The device includes a file information generation unit configured to generate, when the user selects a piece of file identification information identifying a file, attribute information. The attribute information can be, for example, a file attribute of the file corresponding to the selected piece of file identification information. A tactile pattern storage unit is configured to store a tactile pattern corresponding to the file attribute. A tactile pattern acquisition unit is configured to acquire the tactile pattern corresponding to the file attribute of the file corresponding to the piece of file identification information selected by the user from the tactile pattern storage unit. A tactile pattern output unit is configured to output the tactile pattern corresponding to the file attribute of the file corresponding to said file identification information selected by the user, allowing the user of the file selection device to sense the file attribute of the file corresponding to the selected piece of file identification information by sense of touch.

A further exemplary aspect of the invention is a telephone set. The telephone set includes a tactile pattern notification instruction input unit configured to allow a user to input a tactile pattern notification instruction, notifying another party of a predetermined tactile pattern by the sense of touch. A tactile pattern notification instruction transmitter is configured to transmit, when the user inputs the tactile pattern notification instruction during voice communication, a tactile pattern notification request to a telephone set used by the other party. A tactile pattern output unit is configured to output, when a tactile pattern notification request requesting to notify the user of the tactile pattern by the sense of touch is received from the telephone set of the other party during voice communication, the tactile pattern to allow the user to sense the tactile pattern by sense of touch.

Another exemplary aspect of the invention is a voice output device for outputting linguistic information. The linguistic information includes a plurality of linguistic elements such as characters or phrases by voice. The voice output device includes an output information acquisition unit configured to acquire record information. The record information includes the linguistic information recorded and attribute information. The attribute information includes an attribute added to each linguistic element included in the linguistic information. A tactile pattern storage unit is configured to store a predetermined tactile pattern corresponding to each of attributes added to the linguistic elements. A tactile pattern acquisition unit is configured to acquire, for each of linguistic element, the tactile pattern corresponding to an attribute added to the linguistic element of interest from the tactile pattern storage unit. A voice output unit is configured to reproduce the record information and output the reproduced record information by voice. A tactile pattern output unit is configured to output, in parallel with reproduction of each of the linguistic elements, the tactile pattern corresponding to the attribute added to the linguistic element of interest, thus allowing the user of the voice output device to sense the tactile pattern by the sense of touch. The tactile pattern output unit includes a plurality of tactile pins configured to be brought into contact with said user and a tactile pin drive unit configured to drive each of the tactile pins into contact with and away from the user, allowing the tactile pins to output the tactile pattern.

Another exemplary aspect of the invention is a computer program product embodied in a tangible media. The computer program product includes computer readable program codes coupled to the tangible media for causing a computer to function as a voice output device outputting linguistic information including a plurality of linguistic elements. The computer readable program codes include an output information acquisition module configured to acquire the linguistic information and attribute information. The attribute information includes an attribute added to each linguistic element included in the linguistic information. A tactile pattern storage module is configured to store a predetermined tactile pattern corresponding to each of attributes added to the linguistic elements. A tactile pattern acquisition module is configured to acquire the tactile pattern corresponding to an attribute added to each linguistic element from the tactile pattern storage module. A voice output module is configured to read aloud the linguistic elements included in the linguistic information. A tactile pattern output module is configured to output, in parallel with reading aloud each linguistic element, the tactile pattern corresponding to the attribute added to the linguistic element of interest, thus allowing a user of the computer program product to sense the tactile pattern by sense of touch.

Another exemplary aspect of the invention is a computer program product for causing a computer to function as an information input device which displays an entry screen including a plurality of entry fields and allows a user to input information in each of the entry fields. The program codes of the computer program product include an entry screen display module configured to display the entry screen (the entry screen includes the plurality of entry fields). An entry field information generation module is configured to generate, when the user selects one of the entry fields, attribute information. The attribute information includes an attribute to identify whether input in the selected entry field is required. A tactile pattern storage module is configured to store a predetermined tactile pattern corresponding to the attribute to identify whether input in the entry field of interest is required. A tactile pattern acquisition module is configured to acquire the tactile pattern corresponding to the attribute added to the entry field selected by the user from the tactile pattern storing module. A tactile pattern output module is configured to output the tactile pattern corresponding to the attribute added to the selected entry field, thereby allowing the user of the computer program product to sense by the sense of touch whether input in the selected entry field is required.

Another exemplary aspect of the invention is a computer program product for causing a computer to function as a file selection device causing a user to select a file from a plurality of files. The program codes of the computer program product include a file information generation module configured to generate, when the user selects a piece of file identification information identifying a file, attribute information including a file attribute of the file corresponding to the selected piece of file identification information. A tactile pattern storage module is configured to store a tactile pattern corresponding to the file attribute. A tactile pattern acquisition module is configured to acquire the tactile pattern corresponding to the file attribute of the file corresponding to the piece of file identification information selected by the user from the tactile pattern storage module. A tactile pattern output module is configured to output the tactile pattern corresponding to the file attribute of the file corresponding to the file identification information selected by the user to allow the user of the computer program product to sense the file attribute of the file corresponding to the selected piece of file identification information by the sense of touch.

Another exemplary aspect of the invention is a computer program product for causing a computer to function as a voice output device outputting linguistic information including a plurality of linguistic elements such as characters or phrases by voice. The program codes of the computer program product include a tactile pattern storage module configured to store a predetermined tactile pattern corresponding to each of attributes added to linguistic elements. A tactile pattern acquisition module is configured to acquire, for each of linguistic element, the tactile pattern corresponding to an attribute added to the linguistic element of interest from the tactile pattern storage module. A voice output module is configured to reproduce the record information and output the reproduced record information by voice. A tactile pattern output module configured to output, in parallel with reproduction of each linguistic element, the tactile pattern corresponding to the attribute added to the linguistic element of interest to allow the user of the computer program product to sense the tactile pattern by the sense of touch. The tactile pattern output module is coupled to a plurality of tactile pins for contact with the user and a tactile pin drive unit for driving the tactile pins in contact with and away from the user, allowing the tactile pins to output the tactile pattern.

Yet another exemplary aspect of the present invention is a method for outputting linguistic information. The linguistic information includes a plurality of linguistic elements, such as characters and phrases by voice. The method includes an acquiring operation to acquire the linguistic information and attribute information. The attribute information includes an attribute added to each of the linguistic elements included in the linguistic information. A storing operation stores a predetermined tactile pattern corresponding to each of the attributes added to the linguistic elements. An acquiring operation acquires the tactile pattern corresponding to an attribute added to the linguistic elements. A reading operation reads aloud the linguistic elements included in the linguistic information. An outputting operation outputs, in parallel with reading aloud each of the linguistic elements, the tactile pattern corresponding to the attribute added to the linguistic element of interest, thereby allowing a user of the method to sense the tactile pattern by the sense of touch.

The aforementioned summary of the exemplary aspects of the present invention does not enumerate all features of the present invention, and sub combinations of these features can be implementations of the present invention.

EXPLANATION OF REFERENCE NUMERALS

Figure 1:
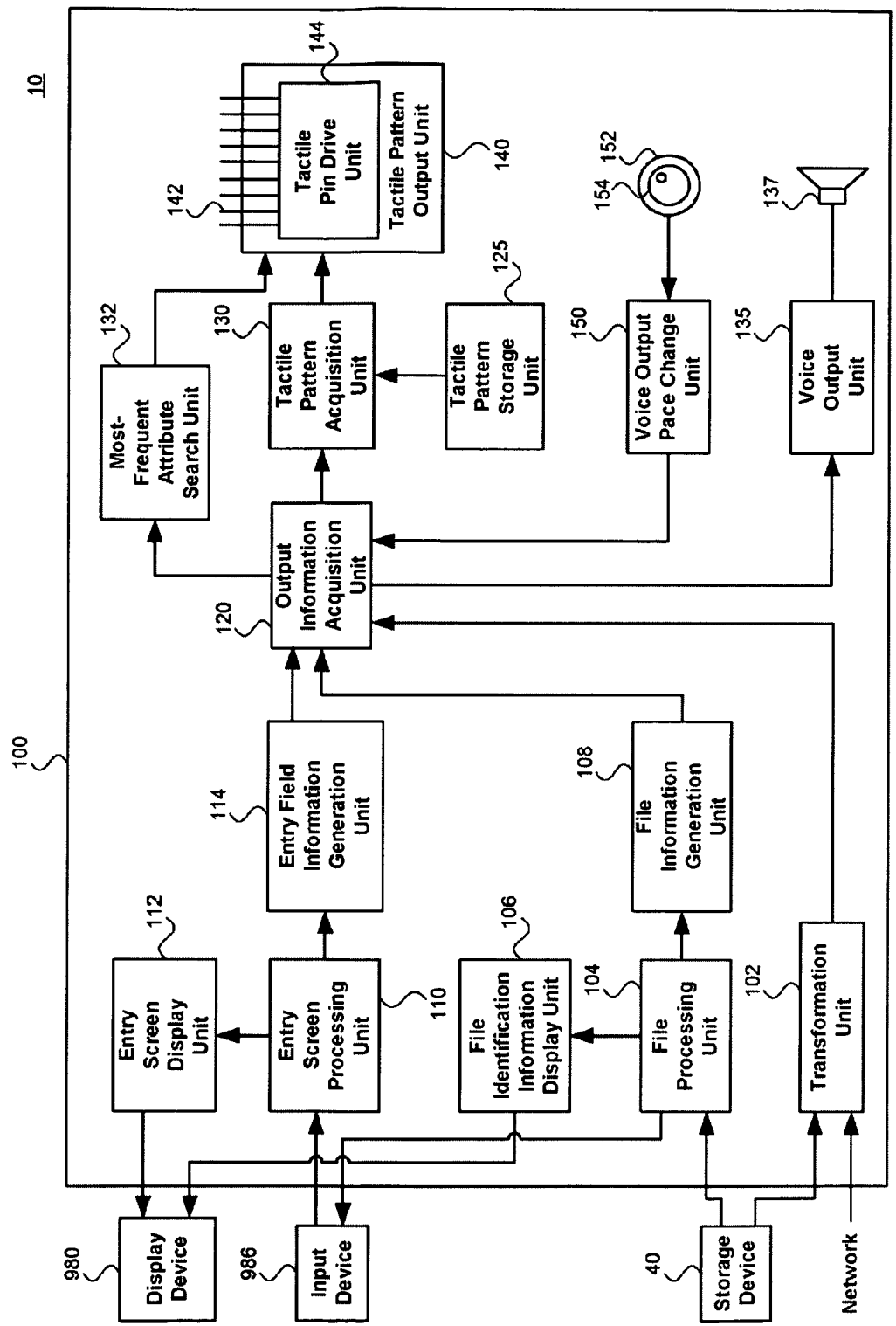
FIG. 1 shows a configuration of a voice output system according to an embodiment of the present invention.

10 . . . voice output system
40 . . . storage device
100 . . . voice output device
102 . . . transformation unit
104 . . . file processing unit
106 . . . file identification information display unit
108 . . . file information generation unit
110 . . . entry screen processing unit
112 . . . entry screen display unit
114 . . . entry field information generation unit
120 . . . output information acquisition unit
125 . . . tactile pattern storage unit
130 . . . tactile pattern acquisition unit
132 . . . most-frequent attribute search unit
135 . . . voice output unit
137 . . . speaker
140 . . . tactile pattern output unit
142 . . . tactile pin
144 . . . tactile pin drive unit
150 . . . voice output speed change unit
152 . . . shuttle dial
154 . . . jog dial
300 . . . screen to be read
310a to 310e . . . output information
400 . . . entry screen
410a to 410j . . . entry field
500 . . . file select screen
510a to 510 . . . file identification information
600 . . . telephone set
610a to 610c . . . tactile pattern notification instruction input units
620 . . . tactile pattern output unit
710 . . . transmitter
720 . . . receiver
750 . . . communication unit
760 . . . voice communication unit
770 . . . tactile pattern notification instruction transmitter
780 . . . tactile pattern notification instruction receiver
900 . . . CPU
910 . . . ROM
920 . . . RAM
930 . . . communication interface
940 . . . storage device
950 . . . flexible disk drive
960 . . . CD-ROM drive
970 . . . I/O chip
975 . . . graphic controller
980 . . . display unit
982 . . . host controller
984 . . . I/O controller
986 . . . input device
988 . . . voice output device
990 . . . flexible disk
995 . . . CD-ROM
1000 . . . computer

DETAILED DESCRIPTION OF THE INVENTION

Hereinafter, a description will be given of the present invention through an exemplary embodiment of the invention. This embodiment does not limit the present invention according to the claims, and all combinations of features described in the embodiment are not necessarily required for means of solving the problems of the present invention.

FIG. 1 shows the configuration of a voice output system 10 according to one embodiment of the invention. The voice output system 10 outputs output information to both senses of hearing and touch of a user in parallel. Herein, the output information is information stored in a storage device 40, information obtained through a network, information which a user should be notified of with output and input through a display device 980 and an input device 986, and the like. The voice output system 10 is configured to efficiently transmit the output information in comparison in the case where the output information is outputted to any one of the senses, as described in detailed below.

The voice output system 10 includes the storage device 40, the display device 980, the input device 986, and a voice input device 100. The storage device 40 stores various types of files including the output information. The display device 980 displays a screen in which information is outputted for a user. The input device 986 allows a user to input an operation in response to a screen displayed on the display device 980. The voice output device 100 outputs the output information using both sound and tactile stimulation. The voice output device 100 outputs linguistic information, among the information, including a plurality of sounds, characters, words, phrases, or the like (also referred to herein as linguistic elements) by voice and causes a user to sense attribute information including an attribute which is added to each of the plurality of linguistic elements included in the linguistic information by the sense of touch.

The voice output device 100 includes a transformation unit 102, a file processing unit 104, a file identification information display unit 106, a file information generation unit 108, an entry screen processing unit 110, an entry screen display unit 112, an entry field information generation unit 114, an output information acquisition unit 120, a tactile pattern storage unit 125, a tactile pattern acquisition unit 130, a most-frequent attribute search unit 132, a voice output unit 135, a speaker 137, a tactile pattern output unit 140, a voice output speed change unit 150, a shuttle dial 152, and a jog dial 154.

The transformation unit 102 receives output information such as a web page or the like inputted via a network and a rich text or the like stored in the storage device 40, transforms the received output information into a combination of linguistic information and attribute information, and then supplies the same to the output information acquisition unit 120. The file processing unit 104 manages files stored in the storage device 40 and performs a process to allow a user to select a file which the user is to access through the input device 986. The file identification information display unit 106 displays a piece of file identification information for each of the plurality of files stored in the storage device 40 on the display device 980. For example, the piece of file identification information may include the name of the file. In the file information generation unit 108, when the user selects a piece of file identification information displayed on the display device 980 by using the input device 986, linguistic information including a phrase indicating a name of a file corresponding to the selected piece of file identification information and attribute information including a file attribute of the file corresponding to that piece of file identification information are generated and then supplied to the output information acquisition unit 120.

The entry screen processing unit 110 performs a process to allow a user to input multiple pieces of information through the entry screen including a plurality of entry fields. The entry screen display unit 112 displays the entry screen on the display device 980. In the entry field information generation unit 114, when a user selects an entry field, linguistic information, which can be a phrase indicating the name of the selected entry field, and attribute information, including an attribute added to the entry field, are generated and then supplied to the output information acquisition unit 120. Herein, the attribute information identifies whether input in the entry field is required. The output information acquisition unit 120 acquires the output information which is composed of the linguistic information and the attribute information and supplied by the transformation unit 102, the file information generation unit 108, and/or the entry field information generation unit 114.

The tactile pattern storage unit 125 stores a predetermined tactile pattern corresponding to each of the attributes added to characters or phrases. The tactile pattern acquisition unit 130 acquires a tactile pattern corresponding to an attribute added to each of a plurality of characters or phrases included in the linguistic information from the tactile pattern storage unit 125. The most-frequent attribute search unit 132 searches for a most-frequent attribute, which is an attribute added to the largest number of characters or phrases among the plurality of characters or phrases included in the linguistic information. The voice output unit 135 reads the plurality of characters or phrases included in the linguistic information acquired by the output information acquisition unit 120 by using means such as voice synthesis and then outputs the same through the speaker 137 by voice.

In parallel with reading of each of the plurality of characters or phrases with the voice output unit 135, the tactile pattern output unit 140 outputs a tactile pattern corresponding to an attribute added to the character or phrase of interest to cause the user of the voice output device 100 to sense the tactile pattern by the sense of touch. Herein, in parallel with reading of each of the plurality of linguistic elements, such as characters or phrases, the tactile pattern output unit 140 outputs a tactile pattern corresponding to the attribute when the attribute added to the character or phrase is not the most-frequent attribute and stops outputting the tactile pattern when the attribute added to the character or phrase of interest is the most-frequent attribute.

The tactile pattern output unit 140 includes a plurality of tactile pins 142 and a tactile pin drive unit 144. The tactile pins 142 are brought into contact with a user. The tactile pin drive unit 144 drives each of the plurality of tactile pins 142 in such a direction that the tactile pin 142 is brought into contact with the user or such a direction that the tactile pin 142 is moving away from the user to cause the plurality of tactile pins 142 to output a tactile pattern. For example, the tactile pattern output unit 140 has a construction that each of the plurality of tactile pins 142 is independently driven by the tactile pin drive unit 144 by using a piezoelectric vibrator or the like, wherein 32 tactile pins 142 are arranged in 16×2.

The voice output speed change unit 150 changes the reading speed of the voice output unit 135 based on an instruction of the user. More specifically, for changing the reading speed, the voice output speed change unit 150 supplies the reading speed to the output information acquisition unit 120. Upon receiving this reading speed, the output information acquisition unit 120 changes the reading speed at which the voice output unit 135 reads the linguistic information and supplies the number of output times of the tactile pattern via the tactile pattern acquisition unit 130. The number of output times is determined based on the reading speed and inversely proportional to the reading speed. Upon receiving this number of output times, as the voice output unit 135 reads a series of characters or phrases to which a same attribute is added, the tactile pattern output unit 140 outputs a tactile pattern corresponding to the attribute added to the series of characters or phrases at a regular speed independent of the reading speed as many times as the number of output times inversely proportional to the reading speed. Accordingly, the tactile pattern output unit 140 can output the tactile pattern at a regular rate independent of the reading speed. Moreover, the tactile pattern can be surely transmitted to the user even in the case of fast forwarding or the like. In the reading of linguistic information inputted via the transformation unit 102, the voice output speed change unit 150 changes a position to be read in the linguistic information based on an instruction of the user.

The voice output speed change unit 150 is connected to the shuttle dial 152 and the jog dial 154. The shuttle dial 152 is an input device with which a user inputs an instruction to change the reading speed. The jog dial is an input device with which a user inputs an instruction to change a position to be read.

The shuttle dial 152 is provided, for example, around the jog dial 154 and returned to a default rotation angle when the user releases his/her hand. The voice output speed change unit 150 sets the reading speed to the standard speed when the shuttle dial 152 is positioned at the default rotation angle. When the user rotates the shuttle dial 152 in one direction, for example, in the clockwise direction, the voice output speed change unit 150 increases the reading speed according to the amount of rotation. On the contrary, when the user rotates the shuttle dial 152 in an opposite direction, for example, in the counterclockwise direction, the voice output speed change unit 150 reduces the reading speed according to the amount of rotation.

Herein, when the user releases his or her hand and the shuttle dial 152 is returned to the default rotation angle, the voice output speed change unit 150 may detect that the shuttle dial 152 has been returned based on the rotational speed of the shuttle dial 152 and maintain the reading speed before the shuttle dial 152 is returned to the default rotation angle.

The jog dial 154 is concentrically provided inside the shuttle dial 152. When the user rotates the jog dial 154 in a direction, for example in the clockwise direction, the voice output rate change unit 150 fast-forwards the linguistic information to be read. When the user rotates the jog dial 154 in the opposite direction, for example, in the counterclockwise direction, the voice output speed change unit 150 rewinds the linguistic information to be read. Herein, the voice output speed change unit 150 may perform fast forwarding and rewinding in phrases, paragraphs, list items or the like. Even in rewinding, phrases, paragraphs, list items, and the like may be reproduced in a forward direction to be recognizable. In addition, when the user continues to rotate the jog dial 154 in a forward or backward direction, the voice output speed change unit 150 allows the voice output unit 135 to perform reading at a reading speed according to the speed of rotation.

According to the voice output device 100 described above, the attribute information included in the linguistic information can be outputted by the sense of touch in parallel with output of the linguistic information of the output information by voice. Therefore, it is possible to present the attribute information to the user without preventing the user from understanding the linguistic information. Moreover, in reading web pages, rich text information, and the like, outputting tactile patterns is stopped in most of the linguistic information, and tactile patterns are outputted only for attributes of part of the linguistic information, thus allowing the user to easily know the attributes. Accordingly, it is possible to efficiently transmit information in the cases of outputting information read by PDA or the like to a moving or driving user, presenting information to visually-impaired people, and the like.

In the above description, the voice output system 10 may have a function to output the attribute information by tactile patterns in synchronization with reproduction of recorded linguistic information. Specifically, the output information acquisition unit 120 acquires record information with linguistic information recorded therein and attribute information including an attribute added to each of a plurality of characters or phrases included in the linguistic information. The voice output unit 135 acquires the record information from the output information acquisition unit 120 and reproduces the record information to output the same by voice. In parallel with reproducing each of the plurality of characters or phrases by the voice output unit 135, the tactile pattern output unit 140 outputs a tactile pattern corresponding to an attribute added to the character or phrase of interest to allow the user to sense the attribute by the sense of touch.

In order to implement the above function, the output information acquisition unit 120 may acquire attribute information, for example, which includes a pair of a recording position in the record information to record each of the plurality of characters or phrases included in the linguistic information and an attribute corresponding to the recording position.

Figure 2:
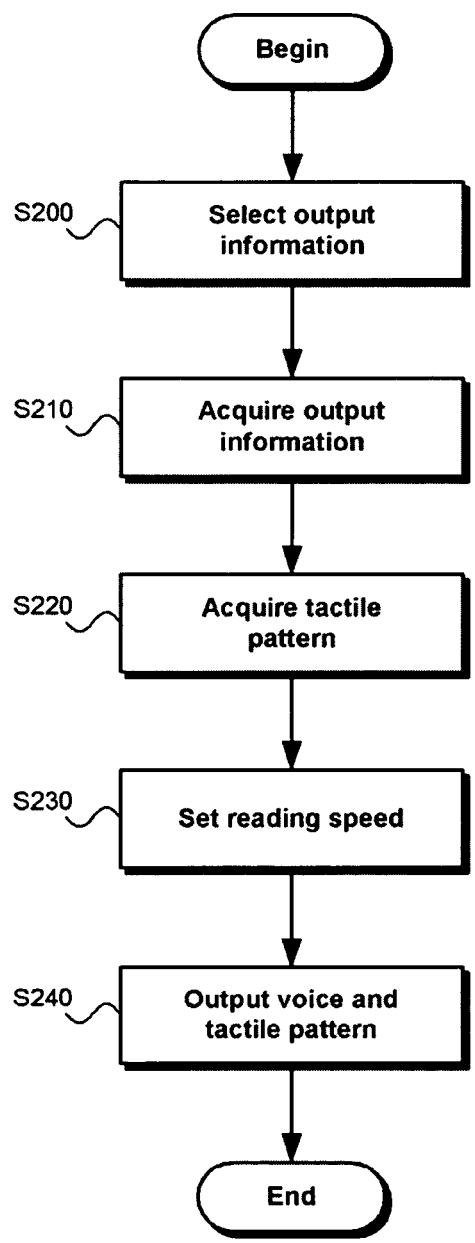
FIG. 2 shows an operation flow of a voice output device according to the embodiment of the present invention.

FIG. 2 shows an operation flow of the voice output device 100 according to one embodiment of the invention. First, the voice output device 100 selects output information to be outputted based on an instruction of a user (S200). Herein, in the case of outputting output information such as web pages or rich text information, the voice output speed change unit 150 selects a reading position in the output information based on an instruction of the user made by the jog dial 154 and supplies the reading position to the output information acquisition unit 120. In the case of assisting the user in selecting a file, the file information generation unit 108 generates the output information including the linguistic information and the attribute information which correspond to a piece of file identification information selected by the user and then supplies the generated output information to the output information acquisition unit 120. In the case of causing the user to input multiple pieces of information in the entry screen, the entry field information generation unit 114 generates the output information including the linguistic information and the attribute information corresponding to an entry field selected by the user and then supplies the generated output information to the output information acquisition unit 120. Herein, the user selects the entry field by an operation such as placing a mouse cursor over the entry field or focusing on the entry field.

Subsequently, the output information acquisition unit 120 acquires the output information which is composed of the linguistic and attribute information and supplied from the transformation unit 102, the file information generation unit 108, and/or the entry field information generation unit 114 (S210). The tactile pattern acquisition unit 130 then acquires a tactile pattern corresponding to an attribute from the tactile pattern storage unit 125, the attribute being added to each of a plurality of characters or phrases included in the linguistic information (S220). The most-frequent attribute search unit 132 searches for the most-frequent attribute as an attribute added to the largest number of characters or phrases among the plurality of characters or phrases included in the linguistic information.

Subsequently, the voice output speed change unit 150 determines the reading speed based on an instruction of the user through the shuttle dial 152 and sets the reading speed at the output information acquiring unit 120 (S230). The voice output unit 135 reads the plurality of characters or phrases included in the linguistic information at the reading speed which the voice output speed change unit 150 sets at the output information acquisition unit 120 (S240). In parallel with reading by the voice output unit 135, the tactile pattern output unit 140 outputs a tactile pattern corresponding to the attribute added to the character or phrase of interest when the attribute is not the most-frequent attribute (S240).

Figure 3:
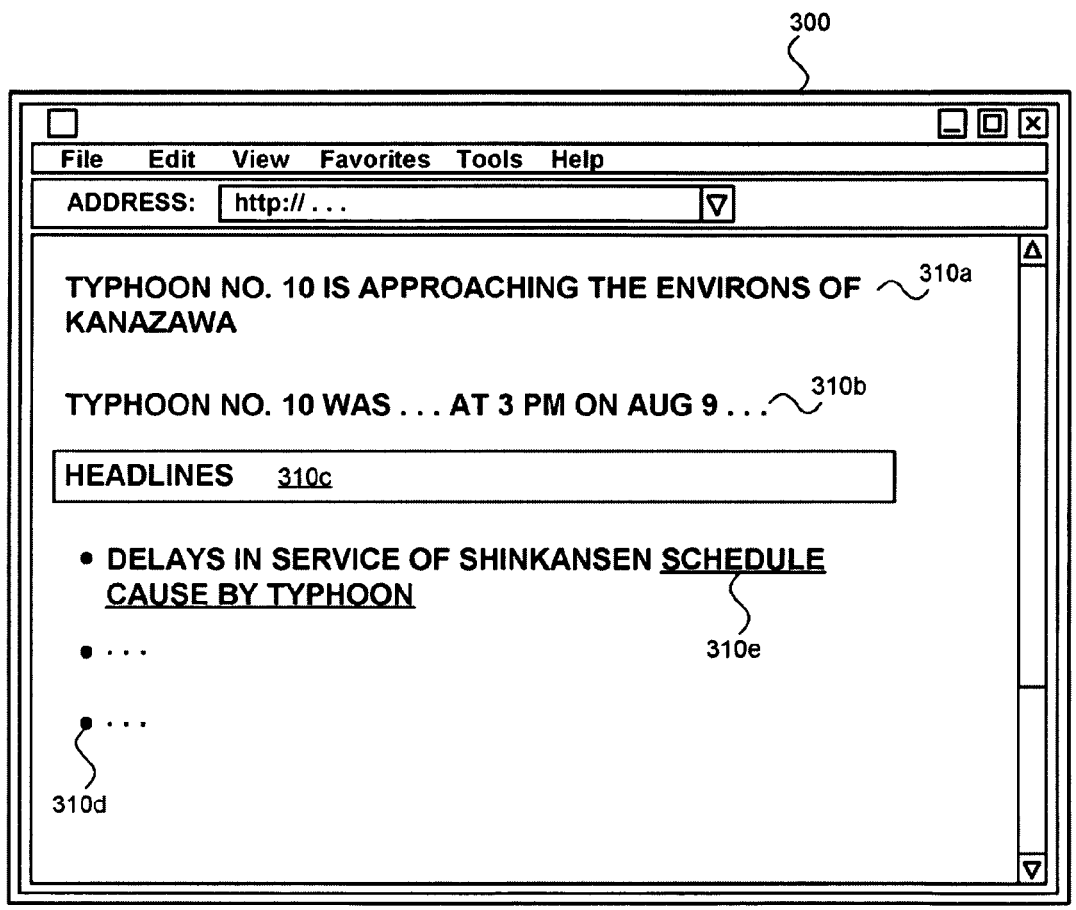
FIG. 3 shows an example of a screen to be read according to the embodiment of the present invention.

FIG. 3 shows a web page obtained via a network, which is an example of a screen 300 to be read according to the embodiment. The screen 300 to be read includes pieces 310*a* to 310*e* of output information as objects to be read.

The piece of output information 310*a* is the output information with a character size larger than usual, for example, such as an article title and a unit name. In order to output such an attribute by a tactile pattern, the tactile pattern storage unit 125 stores a tactile pattern corresponding to each of character sizes. For the piece of output information 310*a*, the output information acquisition unit 120 acquires the attribution information which includes the character size which is added to each of the plurality of characters or phrases included in the linguistic information and the character or phrase of interest should be displayed in as the attribute of the character or phrase. Herein, the linguistic information is text part of the piece of output information 310*a*. For each of the plurality of characters or phrases, the tactile pattern acquisition unit 130 acquires a tactile pattern corresponding to the character size of the character or phrase of interest from the tactile pattern storage unit 125 as a tactile pattern corresponding to the attribute added to the character or phrase. The tactile pattern output unit 140 outputs the tactile pattern corresponding to the character size to allow the user to sense the character size attributes added to the linguistic information.

The piece of output information 310b is the output information including an attribute most frequently used in the screen 300 to be read. The most-frequent attribute search unit 132 searches for the most-frequent attribute in the output information included in the screen 300 to be read. In the case where the attribute added to a character or phrase is the most-frequent attribute like the piece of output information 310b, the tactile pattern output unit 140 stops outputting the tactile pattern in the reading of the piece of output information 310b. The tactile pattern output unit 140 stops outputting the tactile pattern when outputting the most of the linguistic information and outputs tactile patterns for only part of the linguistic information in parallel with the reading. This enables the user to easily know the tactile patterns for this part of the linguistic information.

The piece of output information 310c is the output information composed of a pair of the linguistic information including a plurality of characters or phrases displayed in a screen of the display device 980 that the user uses and the attribute information including a background color of a position where each of the plurality of characters or phrases included in the linguistic information is displayed as the attribute of the character or phrase of interest. In order to output such an attribute by the tactile pattern, the tactile pattern storage unit 125 stores a tactile pattern corresponding to each of background colors in advance. For each of the plurality of characters or phrases, the tactile pattern acquisition unit 130 outputs a tactile pattern corresponding to the background color at a position where the character or phrase of interest is displayed in the screen of the display device 980 as the tactile pattern corresponding to the attribute added to the character or phrase. Upon receiving the tactile pattern, the tactile pattern output unit 140 outputs the tactile pattern corresponding to the background color. Therefore, it is possible to properly transmit the output information classified by background colors to the user.

The piece of output information 310d is the output information including, as the attribute information, an attribute that is added to each of the plurality of characters or phrases and identifies that the character or phrase of interest is a line's first character in list display. Herein, the list display is a display style composed of a plurality of items each including part of the plurality of characters or phrases, the items following respective line's first characters, for example, such as "•", "-", "*", and "(1), (2) . . . " In order to output such an attribute by a tactile pattern, the tactile pattern storage unit 125 stores a tactile pattern corresponding to each type of the line's first characters in advance. For each of the plurality of characters or phrases, the tactile pattern acquisition unit 130 outputs a tactile pattern corresponding to an attribute identifying that the character or phrase of interest is the line's first character when the character or phrase is the line's first character. In parallel with reading of each of the plurality of characters or phrases, the tactile pattern output unit 140 outputs a tactile pattern corresponding to the attribute that is added to the character or phrase of interest and identifies that the character or phrase is the line's first character. Therefore, each item can be properly transmitted to the user.

The piece of output information 310e is output information including at least one attribute of bold, italic, and underline display in displaying the character or phrase of interest, the attribute being added to each of the plurality of characters or phrases. In FIG. 3, the attribute information corresponding to the piece of output information 310e includes the underline display attribute added to a phrase "Shinkansen schedule". In order to output such an attribute by a tactile pattern, the tactile pattern storage unit 125 stores a tactile pattern corresponding to at least one attribute of bold, italic, and underline display in advance. For each of the plurality of characters or phrases, when at least one attribute of bold, italic, and underline display is added to the character or phrase of interest, the tactile pattern acquisition unit 130 outputs a tactile pattern corresponding to the attribute. In parallel with reading each of the plurality of characters or phrases, the tactile pattern output unit 140 outputs the tactile pattern corresponding to at least one attribute of bold, italic, and underline display added to the character or phrase of interest. Therefore, these character decoration types can be properly transmitted to the user. In addition to the above, the tactile pattern output unit 140 may output tactile patterns corresponding to attributes such as enclosing marks added to characters or phrases.

In the above description, the transformation unit 102 may transform the output information into the linguistic information and the attribute information by transforming the output information such as a web page into output information expressed by a markup language, in which the attribute information is added to a text of the linguistic information in tag format.

Figure 4:
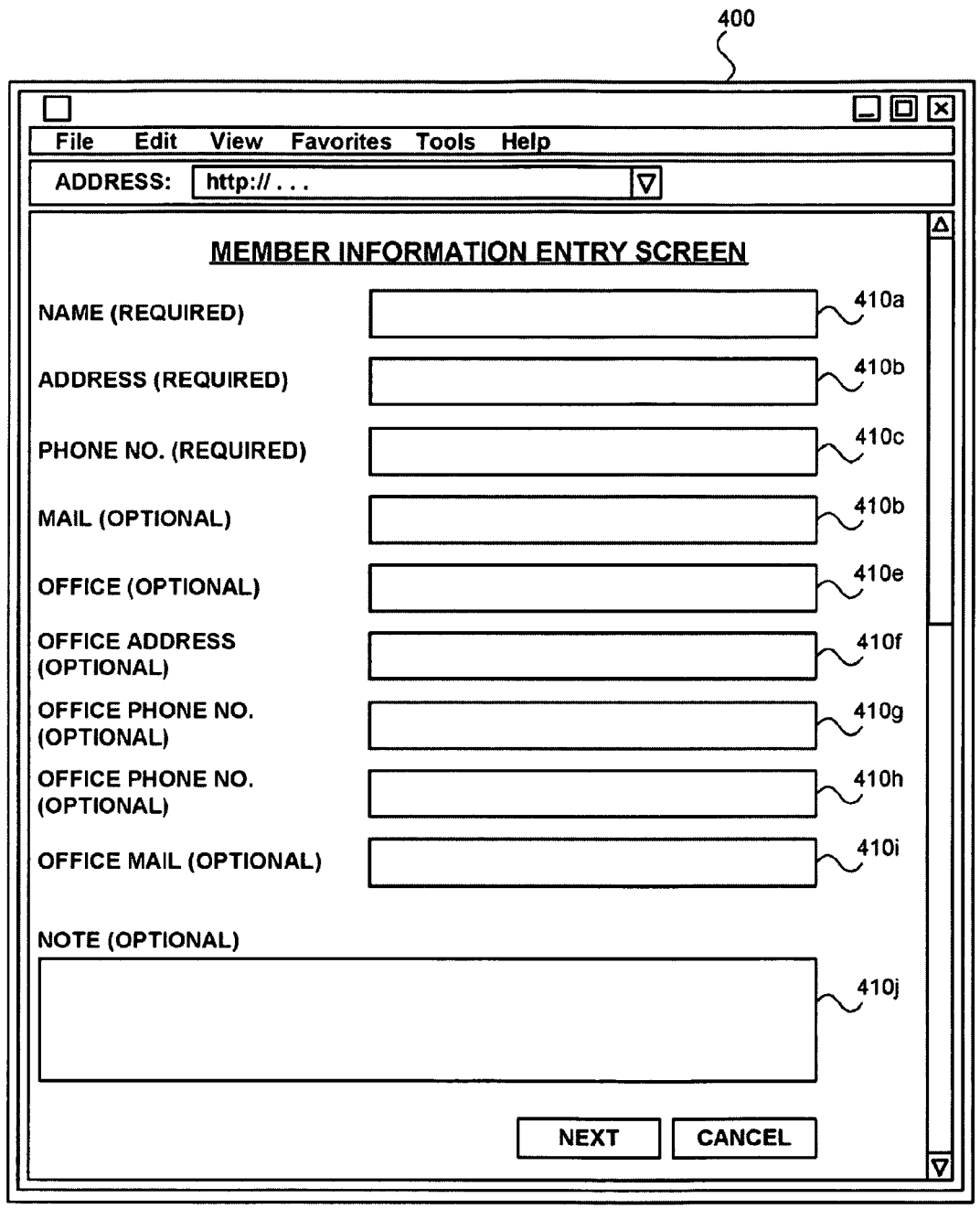
FIG. 4 shows an example of an entry screen according to the embodiment of the present invention.

FIG. 4 shows an example of an entry screen 400 according to one embodiment of the invention. The entry screen 400 is displayed on the display device 980 by the entry screen display unit 112 and includes a plurality of entry fields 410.

When the user selects one of entry fields 410a to 410j, the entry field information generation unit 114 generates the linguistic information which is a phrase indicating a name of the selected entry field and the attribute information added to the selected entry field. This attribute information includes an attribute identifying whether input in the entry field is required. In order to output such an attribute by a tactile pattern, the tactile pattern storage unit 125 previously stores a tactile pattern which indicates that input in the entry field is required to correspond to the attribute which is included in the attribute information supplied from the file information generation unit 108 and identifies that input in an entry field of interest is required. Moreover, the tactile pattern storage unit 125 previously stores a tactile pattern indicating that input in an entry field of interest is not required to correspond to an attribute identifying that input in the entry field of interest is not required.

The tactile pattern acquisition unit 130 acquires a tactile pattern corresponding to an attribute added to an entry field from the tactile pattern storage unit 125, the entry field 410 being selected by the user. The voice output unit 135 reads the name of an entry field included in the linguistic information. In parallel with the reading of the name of the entry field, the tactile pattern output unit 140 outputs the tactile pattern corresponding to the attribute added to the entry field of interest to allow the user of the voice output device 100 to sense by the sense of touch whether input in the entry field of interest is required.

For example, in the case where the user selects the entry field "name", the voice output unit 135 reads the "name" as the name assigned to the selected entry field. In parallel with this reading, the tactile pattern output unit 140 outputs a tactile pattern corresponding to an attribute identifying that input in the entry field of "name" is required. On the other hand, in the case where the user selects the entry field "mail", the voice output unit 135 reads the "mail". In parallel with this reading, the tactile pattern output unit 140 outputs a tactile pattern corresponding to an attribute identifying that input in the entry field "mail" is not required.

Figure 5:
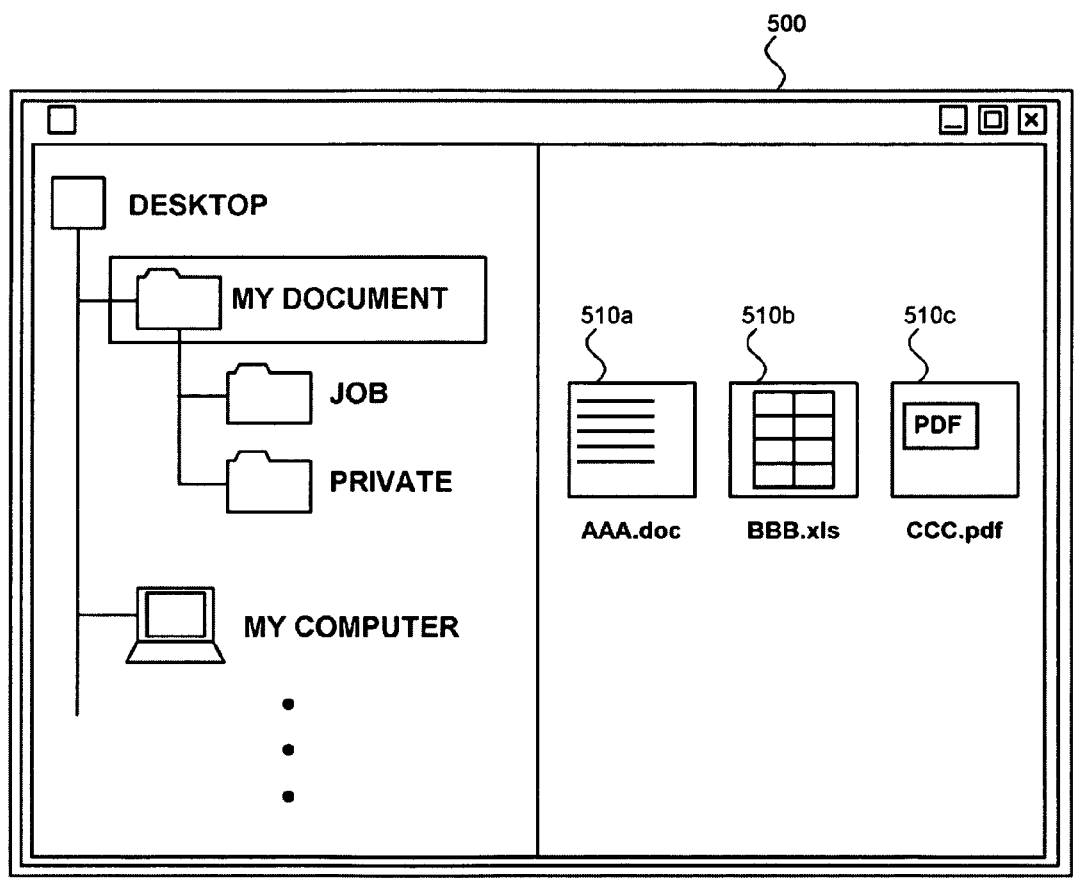
FIG. 5 shows an example of a file select screen according to the embodiment of the present invention.

FIG. 5 shows an example of a file select screen 500 according to one embodiment of the invention. The file select screen 500 is a screen allowing the user to select a file and displayed on a display device 980 by the file identifying information display unit 106.

The file select screen 500 includes multiple pieces 510a to 510c of file identification information each including different file names. When the user selects one of pieces 510a to 510c of file identification information displayed on the display device 980 by using the input device 986, the file information generation unit 108 generates the linguistic information and the attribute information. Herein, the linguistic information includes a phrase indicating a name of a file corresponding to the selected piece of file identification information 510. The attribute information includes a file attribute of the file corresponding to the selected piece of file identification information 510. The file information generation unit 108 then supplies the generated linguistic and attribute information to the output information acquisition unit 120. In order to output such a file attribute by a tactile pattern, the tactile pattern storage unit 125 stores in advance a tactile pattern corresponding to each of file attributes included in attribute information supplied from the entry field information generation unit 114. Herein, the file attributes may be file extensions, namely, attributes usually used for identifying file types, for example, such as ".doc", ".xls", and ".pdf", or may be attributes such as size of a file of interest or the access right to a file of interest.

The tactile pattern acquisition unit 130 acquires, from the tactile pattern storage unit 125, a tactile pattern which corresponds to the file attribute of the file corresponding to the piece of file identification information 510 selected by the user. The voice output unit 135 reads the file name included in the linguistic information. In parallel with reading of the file name, the tactile pattern output unit 140 outputs the tactile pattern which corresponds to the file attribute of the file corresponding to the selected piece of file identification information 510 to allow the user to sense the tactile pattern by the sense of touch.

For example, in the case where the user selects the piece 510a of file identification information, the voice output unit 135 reads a file name "AAA" corresponding to the piece 510a of file identification information. The tactile pattern output unit 140 outputs a tactile pattern corresponding to the file attribute of the file in parallel with the reading.

Figure 6:
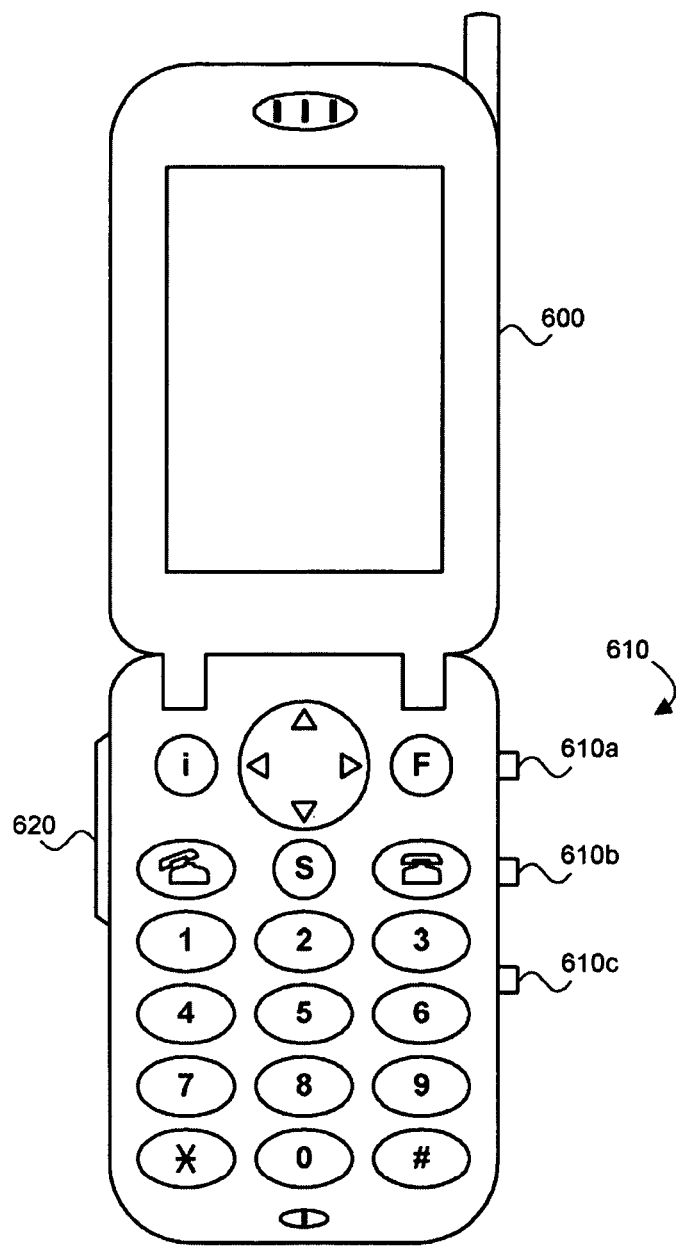
FIG. 6 shows an exterior of a telephone set according to a modified example of the embodiment of the present invention.

FIG. 6 shows the exterior of a telephone set 600 according to a modified example of the embodiment. An object of the telephone set 600 is to transmit a tactile pattern to a party based on an instruction of a user and enable the user to sense a tactile pattern transmitted from the party during voice communication.

The telephone set 600 includes a tactile pattern notification instruction input unit 610 and a tactile pattern output unit 620. The tactile pattern notification instruction input unit 610 allows a user to input a tactile pattern notification instruction to notify a party of a predetermined tactile pattern by the sense of touch. The tactile pattern output unit 620 outputs a tactile pattern transmitted to the user from a telephone set of the party to allow the user to sense the tactile pattern. In this modified example, a plurality of the tactile pattern notification instruction input units 610, including input units 610a to 610c, are provided to allow the user to input instructions to notify the party of different tactile patterns.

In this modified example, the tactile pattern notification instruction input units 610 are provided at such positions that the user can operate them by using the index, the middle, and/or the ring finger. On the other hand, the tactile pattern output unit 620 is provided at such a position that the user can sense the tactile pattern by the sense of touch with the thumb. It is contemplated that instead of the tactile pattern notification instruction input units 610a to 610c described above, the telephone set 600 may implement the same function as that of the tactile pattern notification instruction input units 610a to 610c by performing a predetermined operation with dial buttons during voice communication.

Figure 7:
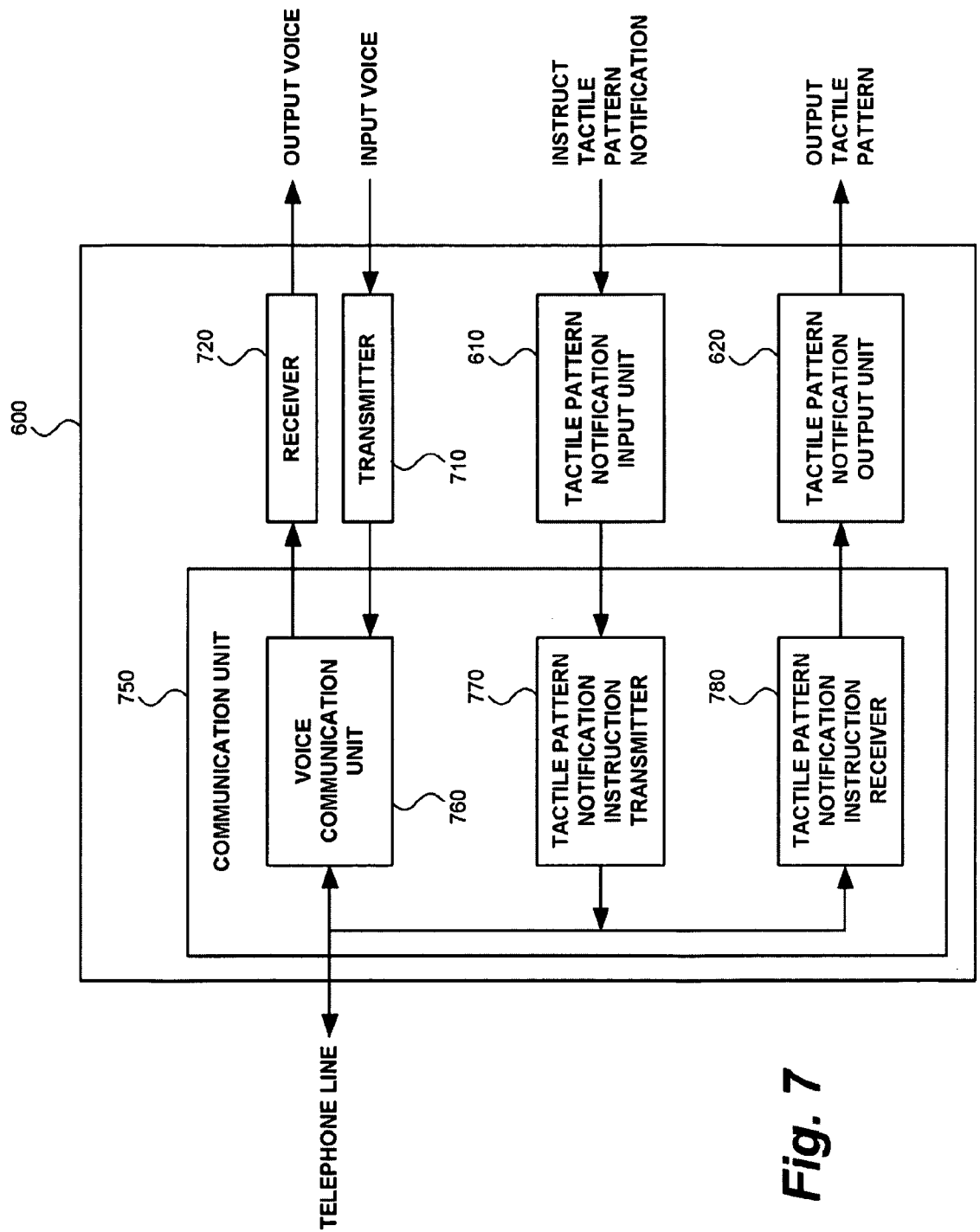
FIG. 7 shows a configuration of the telephone set according to the modified example of the embodiment of the present invention.

FIG. 7 shows the configuration of the telephone set 600 according to the modified example of the embodiment. The telephone set 600 includes the tactile pattern notification instruction input unit 610, the tactile pattern output unit 620, a transmitter 710, a receiver 720, and a communication unit 750. The tactile pattern notification instruction input unit 610 allows a user to input the tactile pattern notification instruction. When the tactile pattern notification instruction is inputted from the user during voice communication, the tactile pattern notification instruction input unit 610 transmits a tactile pattern notification request for requesting notification of a tactile pattern to a telephone set used by a party via a tactile pattern notification instruction transmitter 770 within the communication unit 750.

In the case of receiving the tactile pattern notification request for requesting notification of a tactile pattern by the sense of touch from the telephone set of the party to the user during voice communication, the tactile pattern output unit 620 outputs the tactile pattern to allow the user to sense the tactile pattern by the sense of touch. The tactile pattern output unit 620 may have the same configuration as that of the tactile pattern output unit 140 shown in FIG. 1. The transmitter 710 receives the voice that the user of the telephone set 600 spoke during voice communication. The receiver 720 receives the voice that the party spoke from the telephone set thereof via a voice communication unit 760 within the communication unit 750 during voice communication and outputs the received voice as voice.

The communication unit 750 includes the voice communication unit 760, the tactile pattern notification instruction transmitter 770, and a tactile pattern notification instruction receiver 780. The voice communication unit 760 relays voice communication between the user of the telephone set 600 and the party through a telephone line. The tactile pattern notification instruction transmitter 770 transmits the tactile pattern notification request based on a user's instruction inputted in the tactile pattern notification instruction input unit 610 to the telephone set of the party via the telephone line. The tactile pattern notification instruction receiver 780 outputs to the tactile pattern output unit 620 the tactile pattern notification request transmitted to the telephone set 600 through the tactile pattern notification instruction input unit 610 and the tactile pattern notification instruction transmitter 770 which are provided in the telephone set of the party and causes the tactile pattern output unit 620 to output the tactile pattern to the user.

According to the telephone set 600 described above, the user of the telephone set 600 can notify the party of attributes of contents in the conversation and the like by the sense of touch by operating the tactile pattern notification instruction input unit 610 during voice communication. In other words, for example, the user of the telephone set 600 can transmit a tactile pattern in response to an important matter in the conversation, so that it can be informed that the content of presently spoken is the important matter.

Figure 8:
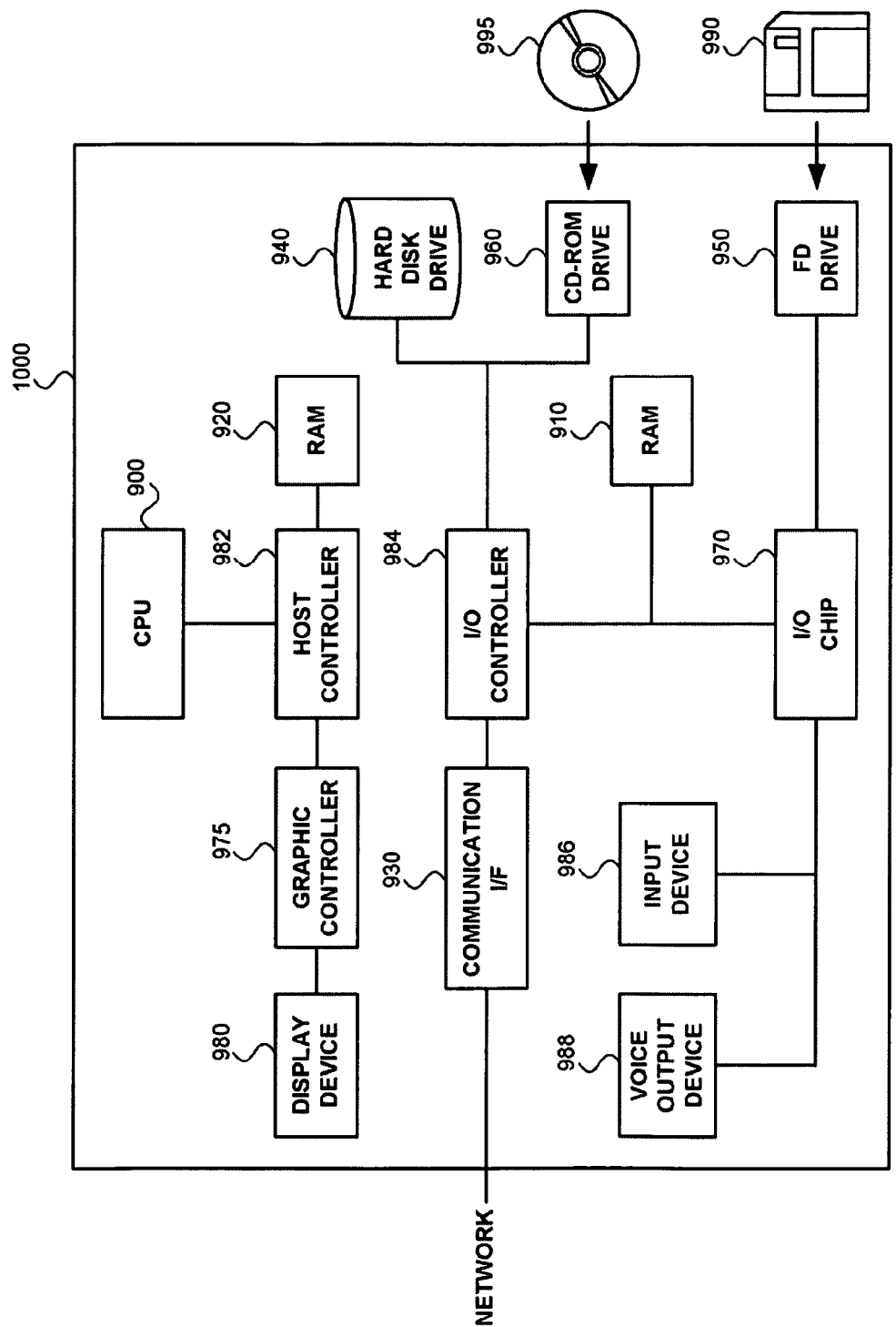
FIG. 8 shows an example of a hardware configuration of a computer according to the embodiment of the present invention.

FIG. 8 shows an example of the hardware configuration of a computer 1000 according to the embodiment. The computer 1000 according to the embodiment includes a CPU periphery block, an input/output block, and a legacy input/output block. The CPU periphery block includes a CPU 900, a RAM 920, and a graphic controller 975, each being mutually connected through a host controller 982. The input/output block includes a communication interface 930, a storage device 940, and a CD-ROM drive 960, each being connected to the host controller 982 through an I/O controller 984. The legacy input/output block includes a ROM 910, a flexible disk drive 950, an I/O chip 970, an input device 986, and a voice output device 988, which are connected to the I/O controller 984.

The host controller 982 connects the RAM 920 and each of the CPU 900 and the graphic controller 975 which access the RAM 920 at high transfer rate. The CPU 900 operates based on programs stored in the ROM 910 and the RAM 920 and controls each block. The graphic controller 975 acquires image data that the CPU 900 and the like create on a frame buffer provided within the RAM 920 and displays the image data on the display device 980. Instead, the graphic controller 975 may include a frame buffer storing the image data that the CPU 900 and the like create.

The I/O controller 984 connects the host controller 982 and each of the communication interface 930, the storage device 940, and the CD-ROM drive 960, which are comparatively high speed input/output devices. The communication interface 930 communicates with other devices via a network. The storage device 940 stores programs and data used by the CPU 900 within the computer 1000. The CD-ROM drive 960 reads programs and data from a CD-ROM 995 and provides the programs and data to the storage device 940 via the RAM 920.

The I/O controller 984 is connected to the ROM 910 and the comparatively low speed input/output devices such as the flexible disk drive 950, the I/O chip 970, the input device 986, and the voice output device 988. The ROM 910 stores a boot program that the computer 1000 executes on start up, a program depending on hardware of the computer 1000, and the like. The flexible disk drive 950 reads a program or data from a flexible disk 990 and provides the program or data to the storage device 940 via the RAM 920. The I/O chip 970 connects the flexible disk drive 950 and connects various input/output devices including the input device 986 and the voice output device 988 via, for example, a parallel port, serial port, keyboard port, mouse port and the like. The voice output device 988 includes the speaker 137, the tactile pins 142, and the tactile pin drive unit 144, the shuttle dial 152, and the jog dial 154 of the voice output device 100 shown in FIG. 1.

The program provided for the storage device 940 via the RAM 920 is stored in a recording medium such as the flexible disk 990, the CD-ROM 995, or an IC card and provided by the user. The program is read out from the recording medium, installed in the storage device 940 within the computer 1000 via the RAM 920, and executed in the CPU 900.

A program installed in the computer 1000 to cause the computer 1000 to function as the voice output system 10 includes a transforming module, a file processing module, a file identification information display module, a file information generation module, an entry screen processing module, an entry screen display module, an entry field information generation module, an output information acquisition module, a tactile pattern storage module, a tactile pattern acquisition module, a most-frequent attribute search module, a voice output module, a tactile pattern output module, and a voice output speed change module. The program or these modules are caused to function as the transformation unit 102, the file processing unit 104, the file identification information display unit 106, the file information generation unit 108, the entry screen processing unit 110, the entry screen display unit 112, the entry field information generation unit 114, the output information acquisition unit 120, the tactile pattern storage unit 125, the tactile pattern acquisition unit 130, the most-frequent attribute search unit 132, the voice output unit 135, the tactile pattern output unit 140, and the voice output speed change unit 150, respectively.

A program installed in the telephone set 600 includes a tactile pattern notification instruction input module, a tactile pattern output module, a transmitter module, a receiver module, and a communication module having a voice communication module, a tactile pattern notification instruction transmitter module, and a tactile pattern notification instruction receiver module. These programs or modules cause the telephone set 600 to function as the tactile pattern notification instruction input unit 610, tactile pattern output unit 620, transmitter unit 710, receiver unit 720, and the communication unit 750 having the tactile pattern notification instruction transmitter unit 770, tactile pattern notification instruction receiver unit 780, and the voice communication unit 760, respectively.

The programs or modules described above may be stored in an external storage medium. For the storage medium, an optical recording medium such as DVD or PD, a magneto-optical recording medium such as MD, a tape medium, a semiconductor memory such as an IC card, or the like is available in addition to the flexible disk 990 and the CD-ROM 995. Alternatively, it is possible to use a storage device such as a hard disk or RAM provided in a server system connected to a private communication network or the Internet as the storage medium and provide the programs to the computer 1000 via a network.

The present invention has been described above by using the embodiment, but the technical scope of the invention is not limited to the scope described in the above embodiment. It will be understood by those skilled in the art that various changes or modifications can be applied to the aforementioned embodiment. It is apparent from the claims that modes with these various changes or modifications applied thereto fall within the technical scope of the present invention.

For example, the voice output system 10 may function as an information input device which displays an entry screen including a plurality of entry fields and allows a user to input information in the individual entry fields. Specifically, the entry field information generation unit 114 generates the attribute information including an attribute which identifies whether input in an entry field selected by the user is required. The voice output device 100 may allow the user to sense with the tactile pattern output unit 140 whether input in the entry field of interest is required without reading aloud the name of the entry field by the voice output unit 135. Accordingly, the voice output system 10 can properly notify the user of the attribute of the entry field by a combination of the screen display by the display device 980 and output of the tactile pattern by the tactile pattern output unit 140.

Moreover, the voice output system 10 may function as a file selection device to allow a user to select a file from a plurality of files. Specifically, when the user selects a piece of file identification information for identifying a file, the file information generation unit 108 generates the attribute information including the file attribute of the file corresponding to the piece of file identification information of interest. The voice output device 100 may output a tactile pattern corresponding to the file attribute of the file without reading aloud the name of the file by the voice output unit 135 to allow the user of the file selection device to sense the file attribute by the sense of touch. Accordingly, the voice output system 10 can properly notify the user of the file attribute by a combination of the screen display by the display device 980 and the output of the tactile pattern by the tactile pattern output unit 140.

Thus, the embodiments disclosed were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

The invention claimed is:

1. A voice output device for outputting linguistic information, said linguistic information including a plurality of linguistic elements such as characters and phrases by voice, the voice output device comprising:
   an output information acquisition unit configured to acquire said linguistic information and attribute information, the attribute information including an attribute added to each of said plurality of linguistic elements included in said linguistic information;
   a tactile pattern storage unit configured to store a predetermined tactile pattern corresponding to each of attributes added to said linguistic elements;
   a tactile pattern acquisition unit configured to acquire said tactile pattern corresponding to an attribute added to said plurality of linguistic elements from said tactile pattern storage unit;
   a voice output unit configured to read aloud said plurality of linguistic elements included in said linguistic information; and
   a tactile pattern output unit configured to output, in parallel with reading aloud each of said linguistic elements, said tactile pattern corresponding to the attribute added to said linguistic element of interest to allow a user of the voice output device to sense the tactile pattern by the sense of touch; and
   wherein the attribute added to said linguistic element of interest includes information about how the linguistic elements are visual presented on a screen.

2. The voice outputting device according to claim 1, wherein said tactile pattern output unit includes:
   a plurality of tactile pins configured to be placed in proximity with said user; and
   a tactile pin drive unit configured to drive each of said plurality of tactile pins in any one of a direction that the tactile pin is brought into contact with said user and a direction that the tactile pin is moved away from the user to allow said plurality of tactile pins to output said tactile pattern.

3. A voice output device for outputting linguistic information including a plurality of linguistic elements such as characters or phrases by voice, comprising:
   an output information acquisition unit configured to acquire record information which includes said linguistic information recorded and attribute information which includes an attribute added to each of said plurality of linguistic elements included in said linguistic information;
   a tactile pattern storage unit configured to store a predetermined tactile pattern corresponding to each of attributes added to the linguistic elements;
   a tactile pattern acquisition unit configured to acquire, for each of said plurality of linguistic elements, said tactile pattern corresponding to an attribute added to the linguistic element of interest from said tactile pattern storage unit;
   a voice output unit configured to reproduce said record information and output said reproduced record information by voice; and
   a tactile pattern output unit configured to output, in parallel with reproduction of each of said plurality of linguistic elements, said tactile pattern corresponding to the attribute added to the linguistic element of interest to allow the user of the voice output device to sense the tactile pattern by the sense of touch; wherein
   said tactile pattern output unit includes:
      a plurality of tactile pins configured to be brought into contact with said user; and
      a tactile pin drive unit configured to drive each of said plurality of tactile pins in any one of a direction that the tactile pin is brought into contact with said user and a direction that the tactile pin is moving away from the user to allow said plurality of tactile pins to output said tactile pattern; and
   wherein the attribute added to said linguistic element of interest includes information about how the linguistic elements are visual presented on a screen.

4. A computer program product embodied in a non-transitory tangible media comprising:
   computer readable program codes coupled to the tangible media for causing a computer to function as a voice output device outputting linguistic information including a plurality of linguistic elements such as characters or phrases by voice, the computer readable program codes including:
   an output information acquisition module configured to acquire said linguistic information and attribute information, the attribute information including an attribute added to each of said plurality of linguistic elements included in said linguistic information;
   a tactile pattern storage module configured to store a predetermined tactile pattern corresponding to each of attributes added to the linguistic elements;
   a tactile pattern acquisition module configured to acquire said tactile pattern corresponding to an attribute added to each of said plurality of linguistic elements from said tactile pattern storage module;
   a voice output module configured to read aloud said plurality of linguistic elements included in said linguistic information; and
   a tactile pattern output module configured to output, in parallel with reading aloud each of said plurality of linguistic elements, said tactile pattern corresponding to the attribute added to the linguistic element of interest to allow a user of the computer program product to sense the tactile pattern by the sense of touch; and
   wherein the attribute added to said linguistic element of interest includes information about how the linguistic elements are visual presented on a screen.

5. A computer program product embodied in a non-transitory tangible media comprising:
   computer readable program codes coupled to the tangible media for causing a computer to function as a voice output device outputting linguistic information including a plurality of linguistic elements such as characters or phrases by voice, the computer readable program codes including:
   an output information acquisition module configured to output record information which includes said linguistic information recorded and attribute information which includes an attribute added to each of said plurality of linguistic elements included in said linguistic information;

a tactile pattern storage module configured to store a predetermined tactile pattern corresponding to each of attributes added to linguistic elements;

a tactile pattern acquisition module configured to acquire, for each of said plurality of linguistic elements, said tactile pattern corresponding to an attribute added to the linguistic element of interest from said tactile pattern storage module;

a voice output module configured to reproduce said record information and output said reproduced record information by voice; and a tactile pattern output module configured to output, in parallel with reproduction of each of said plurality of linguistic elements, said tactile pattern corresponding to the attribute added to the linguistic element of interest to allow the user of the computer program product to sense the tactile pattern by the sense of touch, wherein said tactile pattern output module is coupled to:

a plurality of tactile pins configured to contact said user; and a tactile pin drive unit configured to drive each of said plurality of tactile pins in any one of a direction that the tactile pin is brought into contact with said user and a direction that the tactile pin is moving away from the user to allow said plurality of tactile pins to output said tactile pattern; and wherein the attribute added to said linguistic element of interest includes information about how the linguistic elements are visual presented on a screen.

6. A method for outputting linguistic information, said linguistic information including a plurality of linguistic elements such as characters and phrases by voice, the method comprising:

acquiring said linguistic information and attribute information, the attribute information including an attribute added to each of said plurality of linguistic elements included in said linguistic information;

storing a predetermined tactile pattern corresponding to each of the attributes added to said linguistic elements;

acquiring said tactile pattern corresponding to an attribute added to said plurality of linguistic elements;

reading aloud said plurality of linguistic elements included in said linguistic information; and outputting, in parallel with reading aloud each of said linguistic elements, said tactile pattern corresponding to the attribute added to said linguistic element of interest to allow a user of the method to sense the tactile pattern by the sense of touch; and wherein the attribute added to said linguistic element of interest includes information about how the linguistic elements are visual presented on a screen.

* * * * *